United States Patent
Hellberg

(10) Patent No.: US 6,370,184 B1
(45) Date of Patent: Apr. 9, 2002

(54) CORRELATOR RECEIVER

(75) Inventor: Richard Hellberg, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/330,003

(22) Filed: Jun. 11, 1999

(30) Foreign Application Priority Data

Jun. 12, 1998 (SE) .............................................. 9802109

(51) Int. Cl.[7] .................................................. H04K 1/00
(52) U.S. Cl. ...................................... 375/150; 375/152
(58) Field of Search ................................ 375/130, 135, 375/136, 140, 141, 142, 146, 147, 148, 149, 150, 247; 370/320, 335, 342, 441; 341/143, 155; 348/606; 708/300, 314

(56) References Cited

U.S. PATENT DOCUMENTS

| | | | | |
|---|---|---|---|---|
| 5,001,725 A | * | 3/1991 | Sederowicz et al. | 375/247 |
| 5,150,377 A | * | 9/1992 | Vannucci | 375/146 |
| 5,239,556 A | * | 8/1993 | Ishigaki et al. | 375/147 |
| 5,311,544 A | * | 5/1994 | Park et al. | 375/149 |
| 5,388,081 A | * | 2/1995 | Hashimoto et al. | 348/606 |
| 5,412,693 A | * | 5/1995 | Bolla et al. | 375/326 |
| 5,471,209 A | * | 11/1995 | Sutterlin et al. | 341/143 |
| 5,539,770 A | * | 7/1996 | Ishigaki | 375/141 |
| 5,572,552 A | | 11/1996 | Dent et al. | |
| 5,579,335 A | * | 11/1996 | Sutterlin et al. | 375/150 |
| 5,627,855 A | * | 5/1997 | Davidovici | 375/149 |
| 5,715,276 A | * | 2/1998 | Tra et al. | 375/149 |
| 5,742,635 A | * | 4/1998 | Sanderford, Jr. | 375/149 |
| 5,764,686 A | * | 6/1998 | Sanderford et al. | 375/149 |
| 5,764,691 A | * | 6/1998 | Hennedy et al. | 375/149 |
| 5,802,102 A | * | 9/1998 | Davidovici | 375/149 |
| 5,832,027 A | * | 11/1998 | Ishigaki | 375/149 |
| 5,864,578 A | * | 1/1999 | Yuen | 375/149 |
| 5,999,562 A | * | 12/1999 | Hennedy et al. | 375/149 |
| 6,038,249 A | * | 3/2000 | Akiyama | 375/149 |
| 6,047,016 A | * | 4/2000 | Ramberg et al. | 375/148 |

FOREIGN PATENT DOCUMENTS

| | | |
|---|---|---|
| EP | 0 810 741 A2 | 12/1997 |
| GB | 2 188 517 A | 9/1987 |

OTHER PUBLICATIONS

Renfors et al, Global Telecommunications Conference, 1992. Conference Record., Globe Com.92.Communication for Global Users. IEEE pp. 467–471 vol. 1, Dec. 1992.*

* cited by examiner

Primary Examiner—Jean Corrielus
(74) Attorney, Agent, or Firm—Burns, Doane, Swecker & Mathis, L.L.P.

(57) ABSTRACT

The present invention relates generally to receivers in DS-CDMA receivers, and more particularly to the need for providing a pulse-matched filter to eliminate interchip interference. A CDMA RAKE receiver is used. Instead of applying a pulse-matched filter to the input signal as in state of the art systems, a one-bit pulse-matched filter is applied to the spreading sequence, preferably a pseudonoise (PN) sequence, which interpolates up to the required oversampling ratio. Since the filter has a one-bit input, the multipliers can be replaced by adders which consume less power. Also, the number of adders does not increase with the oversampling ratio as do the number of multipliers in the prior art.

6 Claims, 6 Drawing Sheets

State of the art CDMA receiver. (One RAKE tap shown)

CORRELATOR RECEIVER

This application claims priority under 35 U.S.C. §§119 and/or 365 to 9802109-0 filed in Sweden on Jun. 12, 1998; the entire content of which is hereby incorporated by reference.

FIELD OF THE INVENTION

The present invention relates generally to receivers in DS-CDMA radios, and more particularly to the need for providing a pulse-matched filter and channel selectivity to eliminate interchip and other interference.

RELATED ART

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCNs), employing low cost, pocket-size, cordless telephones that can be carried comfortably and used to make or receive calls in the home, office, street, car, etc., will be provided by cellular carriers using the next generation digital cellular system infrastructure and the cellular frequencies. The key feature demanded in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse. In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency. Thus, all CDMA signals share the same frequency spectrum. In the frequency or the time domain, the multiple access signals appear to be on top of each other.

In principle, in a CDMA system the informational data stream to be transmitted is impressed upon a much higher rate data stream known as a signature sequence, or a spreading sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called coding or spreading the informational data stream signal. Each informational data stream or channel is allocated a unique spreading code.

A plurality of coded information signals modulate a radio frequency carrier, for example by quadrature phase shift keying (QPSK), and are jointly received as a composite signal at a receiver. Each of the coded signals overlaps all of the other coded signals, as well as noise-related signals, in both frequency and time. If the receiver is authorized then the composite signal is correlated with one of the unique codes, and the corresponding information signal can be isolated and decoded.

One CDMA technique, called "traditional CDMA with direct spreading", uses a signature sequence to represent one bit of information. Receiving the transmitted sequence or its complement (the transmitted binary sequence values) indicates whether the information bit is a "0" or "1". The signature sequence usually comprises N bits, and each bit is called a "chip". The entire N-chip sequence, or its complement, is referred to as a transmitted symbol. The receiver correlates the received signal with the known signature sequence of its own signature sequence generator to produce a normalized value ranging from −1 to +1. When a large positive correlation results, a "0" is detected; when a large negative correlation results, a "1" is detected.

Another CDMA technique, called "enhanced CDMA with direct spreading" allows each transmitted sequence to represent more than one bit of information. A set of code words, typically orthogonal code words or bi-orthogonal code words, is used to code a group of information bits into a much longer code sequence or code symbol. A signature sequence or scramble mask is modulo-2 added to the binary code sequence before transmission. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code.

In both traditional and enhanced CDMA, the "information bits" referred to above can also be coded bits, where the code used is a block or convolutional code. One or more information bits can form a data symbol. Also, the signature sequence or scramble mask can be much longer than a single code sequence, in which case a subsequence of the signature sequence or scramble mask is added to the code sequence.

In many radio communication systems, the received signal includes two components, an I (in-phase) component and a Q (quadrature) component. This results because the transmitted signal has two components, and/or the intervening channel or lack of coherent carrier reference causes the transmitted signal to be divided into I and Q components. In a typical receiver using digital signal processing, the received I and Q component signals are sampled every $T_c/N$ seconds, where $T_c$ is the duration of a chip, and stored.

In mobile communication systems, signals transmitted between base and mobile stations typically suffer from echo distortion or time dispersion, caused by, for example, signal reflections from large buildings or nearby mountain ranges. Multipath dispersion occurs when a signal proceeds to the receiver along not one but many paths so that the receiver hears many echoes having different and randomly varying delays and amplitudes. Thus, when multipath time dispersion is present in a CDMA system, the receiver receives a composite signal of multiple versions of the transmitted symbol that have propagated along different paths (referred to as "rays"). Each distinguishable "ray" has a certain relative time of arrival $k*T_c$ seconds and spans N of the I and Q chip samples, since each signal image is an N-chip sequence. As a result of multipath time dispersion, the correlator outputs several smaller spikes rather than one large spike. To optimally detect the transmitted symbols (bits), the spikes received must be combined. Typically, this is done by a RAKE receiver, which is so named because it "rakes" all the multipath contributions together.

A RAKE receiver uses a form of diversity combining to collect the signal energy from the various received signal paths, i.e., the various signal rays. Diversity provides redundant communication channels so that when some channels fade, communication is still possible over non-fading channels. A CDMA RAKE receiver combats fading by detecting the echo signals individually using a correlation method and adding them algebraically (with the same sign). Further, to avoid intersymbol interference, appropriate time delays are inserted between the respective detected echoes so that they fall into step again.

In one form of RAKE receiver, correlation values of the spreading sequence with the received signals at different time delays are passed through a delay line that is tapped at expected time delays (dt), the expected time between receiving echoes. The outputs at the RAKE taps are then combined with appropriate weights. Such a receiver searches for the earliest ray by placing a tap at $T_0$, and for a ray delayed by dt by placing a tap at $T_0+dt$, and so forth. The RAKE tap outputs having significant energy are appropriately weighted and combined to maximize the received signal to noise and interference ratio. Thus, the total time delay of the delay line determines the amount of arrival time delay that can be searched.

A diagram of a conventional RAKE receiver using a post-correlator, coherent combining of different rays is shown in FIG. 1. A received radio signal is demodulated by, for example, mixing it with cosine and sine waveforms and filtering the signal in an RF receiver 110, yielding I and Q chip samples. These chip samples are buffered by a buffer 120 which is composed of two buffers, one for the I (in-phase) samples and one for the Q (quadrature) samples. The bottom of each buffer contains the most recently received chip samples in time.

A multiplexer 130 receives the buffered chip samples and sends complex correlators a range of I chip samples and the same range of Q chip samples. The range selected includes N samples corresponding to the N-chip sequence arriving at a certain time. For example, if the I and Q buffers contain 159 chip samples (0–158), and N is 128, then the multiplexer would send chip samples i through (i+127) from the I buffer, and chip samples i through (i+127) from the Q buffer to a correlator, where i is the discrete time index of the signal rays from when the buffers were first filled.

A complex correlation value is formed by each complex correlator 140 which correlate two sets of signal samples, I and Q, to the known spreading sequence (code). Different complex correlators correspond to different received sample ranges, and hence different signal rays. The multiplexer can provide the received samples either serially or in parallel.

In general, a complex correlator correlates a complex input stream (I+jQ samples) to a complex known sequence, producing a complex correlation value. If the signature, or spreading, sequence is not complex, each complex correlator can be implemented as two scalar correlators in parallel, which is defined as a "half-complex" correlator. If the signature sequence is complex, the complex correlators correlate a complex input to a complex sequence, giving rise to "full-complex" correlators.

Following correlation, the complex correlation values are transmitted to the multiplier 150 where they are multiplied by a complex weight referred to as a complex RAKE tap. Each RAKE tap is a complex number consisting of a real part and an imaginary part. The complex correlator correlates a set of data to a known signature sequence. Typically, only the real part of the product of the complex correlation values and the RAKE tap values are sent to the accumulator 160. The accumulator sums the weighted correlation results for all the signal rays processed and sends the accumulated result to a threshold device 170. The threshold device detects a binary "0" if the input is greater than a threshold, or a binary "1" if the input is less than the threshold.

In mathematical terms, suppose $X(n)=I(n)+jQ(n)$ are the chip samples received by the receiver, where $I(n)$ are the I component samples, $Q(n)$ are the Q component samples, and n is the chip sample index corresponding to a respective discrete time. In FIG. 1, $I(n)$ are stored in one buffer and $Q(n)$ are stored in the other. The multiplexer selects a range of I samples and a range of Q samples corresponding to the same ray. If $M(k,n)=M_I(k,n)+jM_Q(k,n)$ is the multiplexer output for ray k, giving N samples (n=0,N–1), then $M(k,n)=X(n+k)$ and $M_I(k,n)=I(n+k)$ and $M_Q(k,n)=Q(n+k)$.

The complex correlator correlates the range of data samples from the multiplexer to a known code sequence. Consider data samples $X(k), X(k+1), \ldots, X(k+N-1)$, which are discrete time samples of the received data. If the receiver is trying to detect a code sequence $C(0), C(1), \ldots C(N-1)$, which consists of N values (usually ±1 values), the correlator correlates some set of N data values with the N code sequence values as follows:

$$R(k) = X(k)C(0) + X(k+1)C(1) + \ldots + X(k+N-1)C(N-1)$$
$$= \sum_{n=0}^{N-1} X(n+k)C(n)$$

where the index k indicates where to start in the data sequence. This corresponds to a relative time of arrival of the signal. Different arrival times correspond to different signal rays. Thus, ray k corresponds to a range of data values needed: $\{X(k),X(k+1), \ldots, X(k+N-1)\}$. If N is large, then rays k and k+1 correspond to ranges which substantially overlap.

The computation of R(k) can be performed by accessing the input data range in parallel or serially. FIG. 2 is representative of a parallel approach. A data buffer 50 stores consecutive time samples of the received signal, X(n). A multiplexer 52 selects a range of N data values, $\{X(k),X(k+1), \ldots, X(k+N-1)\}$, which are sent to the correlator 55. A multiplier which corresponds to each input to the correlator, multiplies each input value with a corresponding coding sequence value. The products are summed together in an adder to form the correlation value R(k).

FIG. 3 is representative of accessing the input range serially to compute R(k). The input buffer 350 stores the received data samples. The buffer may be only one sample long, since only one sample at a time is correlated. If the buffer is more than one sample long, then a multiplexer 352 is needed to select a particular sample X(k+i), where i is determined by the control processor. The value selected is sent to the correlator 355. The correlator first computes the product of the input X(k+i) with one element of the code sequence, C(i), using the multiplier. This product is then added to an accumulator which stores past products. The accumulator is originally set to zero, then i is stepped from 0 to N−1, allowing the accumulation of N products. After N products have been accumulated, they are output from the correlator giving correlation value R(k). Whether performing the correlation in parallel or serially, each data value X(n) consists of b bits. The bits can be accessed and used all at once (parallel computation) or one at a time (bit serial approach).

Regardless of the correlation approach used, the correlator for ray k correlates the multiplexer output M(k,n) to the real code sequence C(n), producing a complex correlation value $R(k)=R_I(k)+jR_Q(k)$ where:

$$R(k) = \sum_{n=0}^{N-1} M(k,n)C(n)$$

and $$R_I(k) = \sum_{n=0}^{N-1} I(n+k)C(n)$$

$$R_Q(k) = \sum_{n=0}^{N-1} Q(n+k)C(n)$$

The RAKE combiner uses RAKE taps $W(k)=W_I(k)+jW_Q(k)$ to multiply the correlation values and accumulate the result into the decision statistic, Z where:

$$Z = \sum_{W(k)\_0+j0}^{k} Re\{W(k)R^*(k)\} = \sum_{W(k)\_0+j0}^{k} W_I(k)R_I(k) + W_Q(k)R_Q(k)$$

The quantity Z is then thresholded in the threshold device 7 to determine whether a "0" or "1" was sent.

FIG. 4 is another diagram illustrating part of a state of the art CDMA RAKE receiver. In direct sequence CDMA (DS-CDMA) there is a necessity for a pulse-matched filter, here a finite impulse filter (FIR) 420. This, together with a corresponding pulse-shaping filter in the transmitter, satisfies the Nyquist criterion, so that there is no interchip interference ("ICI").

There is also a problem in that the system must have the correct phase of the signal before decimation is performed. This can be taken care of either before or after the filtering. It is possible for the signal after filtering to be critically decimated down to the chip rate. However, this would require fractional sample delays to correct the phase of the signal to make the samples correspond to the maximum "eye opening".

It is also possible to obtain the correct phase of the signal before filtering is performed by adjusting the phase at the higher rate. However, this would require an individual decimating filter for each RAKE tap and would only be economical if the number of RAKE taps is low.

In state of the art base stations the cost of the filter can be shared among many users. Here the solution to the above problem is to keep an oversampling ratio of e.g. 4 to 8 to make it possible to sample "sufficiently close" to the maximum eye opening. The oversampling ratio of 4 to 8 is merely an example; other ratios are possible which are higher, lower or in between. It is also not a requirement that the ratio be an integer ratio. The decimation down to the chip rate is then done by the individual RAKE taps. Here, a lower sampling ratio can result in a higher loss of information from imprecise sampling.

In mobile stations, however, the filter is used by only one user who must bear the whole cost for the filter. Therefore the filter should ideally be made to consume as little power or space as possible in the mobile unit. The power consumed by the analog/digital (A/D) converter 410 should also be minimized.

In mobile receivers as shown in FIG. 4 it is possible for a root raised cosine filter, a filter which is ICI-free when convolved with itself, to be applied to the multibit output signal from an A/D converter. Either two A/D converters are used, one each for the I and Q parts of the signal, or a digital I/Q demodulator is used. These filters are applied to the signal at an oversample rate (OSR) of e.g. 4 times the chip rate to achieve good time resolution for the RAKE taps. An OSR different from 4 times the chip rate can be also used, with various trade-offs between implementation cost and detector loss.

The filtered signal is then multiplied with the PN sequence 430, which is individually delayed for each reflection in the multipath channel response. This signal is then integrated over the time period of one bit. The multiplication (440) with the PN sequence and the integration (450) over a bit interval is known as despreading, or correlating with the PN sequence.

The filters in these state of the art mobiles require something on the order of e.g. 16 time sidelobes to achieve good filtering. This, in addition to the need for oversampling, leads to an implementation with many multipliers. Unfortunately, multipliers consume substantial power and chip area in comparison with other units such as adders.

SUMMARY OF THE INVENTION

The present invention achieves the objectives of reducing power consumption and chip area, among other objectives, by moving the filter, which may be pulse-shaped or pulse-matched, from the input signal, as shown in FIG. 4, to the PN sequence, as shown in FIG. 5. Correlation is then performed with a pulse-shape filtered version of the PN sequence. This has the advantage of replacing the multibit pulse-matched filter on the input signal with a one-bit pulse-shaped filter on the PN sequence, which interpolates up to the required oversampling ratio.

Since the filter now has a one-bit input, the multipliers reduce to adders, and the number of adders can be reduced by storing multiple filter responses that correspond to short PN sequences. If 6 responses are stored which correspond to 4-chip sequences, the number of adders can be reduced by 4. The number of responses required is 16, but by time-reversing and/or inverting, the 6 stored responses can be used for all 16.

A result of this is that the number of adders does not increase in the present invention as the oversampling ratio increases, as compared to the state of the art, where the number of multipliers increases with an increase in the oversampling ratio. However, the speed at which the adders run does increase with the oversampling ratio, although it is also true that the speed of the multipliers in the current approaches also increase with the oversampling ratio.

Since the filtered version of a portion of the PN sequence (corresponding to a bit interval, for example) stretches out in time several filter sidelobes before and after the sequence, two correlators must overlap to be able to process the whole PN sequence. In the present invention they are designed to despread every other bit. One bit is the longest possible length to correlate over since a longer period results in information from two bits ending up in the same correlate. However, it is also possible to correlate over two half-bit intervals and add the two results together afterwards, or correlate over three one-third bit intervals etc. If the spreading factor is 64 the filter can have an impulse response 64 chips long without having to use a third correlator.

The present invention can also make use of sigma-delta modulated signals from the A/D converter. A sigma-delta signal in this invention does not have to be decimation filtered, so cheap sigma-delta A/Ds can be used with just enough passband for the signal, and without having to filter out the noise and then decimate. The resulting invention results in less power consumption than prior art receivers.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 5:
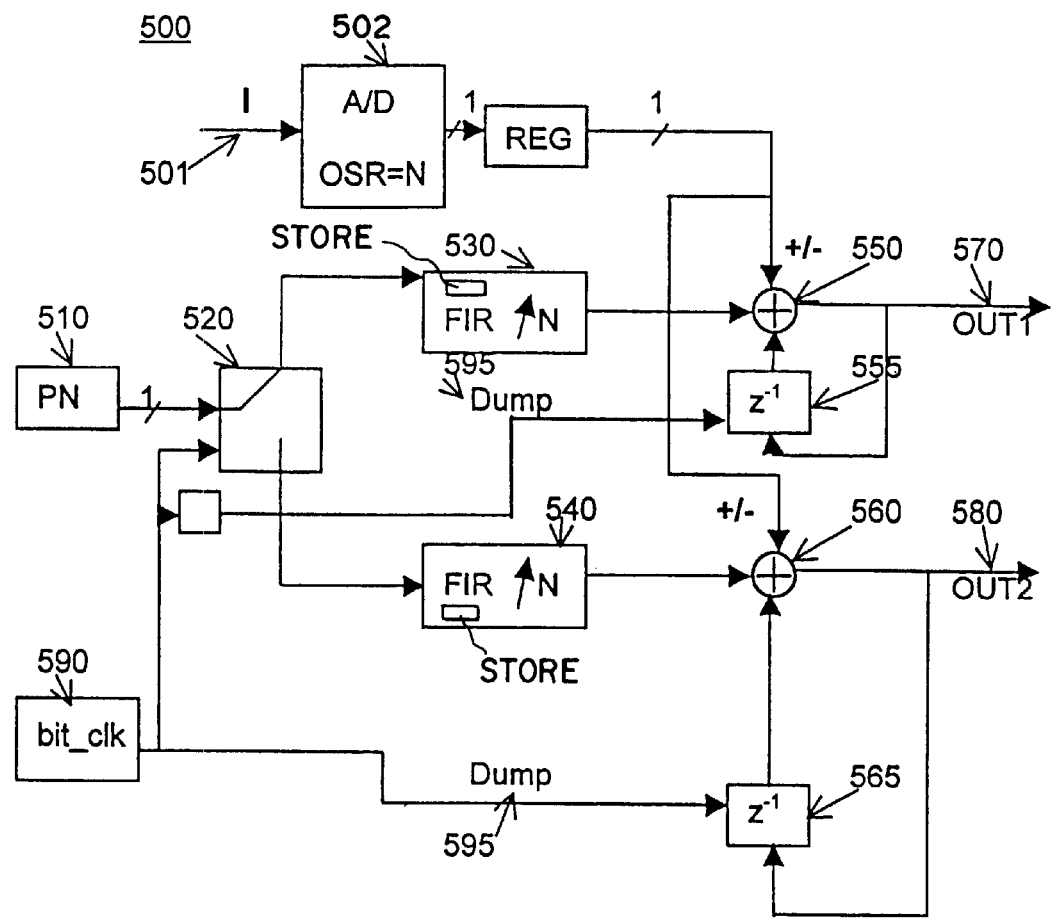
FIG. 5 is a schematic CDMA RAKE receiver using a filtered PN sequence according to the present invention.

In FIG. 5 is shown a diagram of a CDMA RAKE receiver using the technique according to the present invention. One RAKE tap 500 is shown here. The pseudonoise (PN) sequence 510 is fed into the receiver one bit at a time. Although it is a pseudonoise sequence 510 which is shown in the preferred embodiment here, it is to be understood that this can, in general be any spreading or despreading sequence. A switch 520 is shown here which alternates between the two correlators for every other bit.

Since the filtered version of a portion of the PN sequence stretches out in time several filter sidelobes before and after the sequence, two correlators must overlap to be able to process the whole PN sequence. They will despread every other bit. One bit is the longest possible length to correlate over since a longer period results in information from two bits ending up in the same correlate. However, it is also possible to correlate over two half-bit intervals and add the two results together afterwards, or correlate over three one-third bit intervals etc. If the despreading factor is 64, i.e. 64 chips per bit, then the filter can have an impulse response 64 chips long without having to use a third correlator.

Each alternating bit of the PN sequence will be fed to an alternate filter 530, 540. Although there are two filters illustrated here, it is also possible that these two filters are embodied as one filter which alternately filters the alternating bits of the PN sequence. They can also be embodied as two filters which also share, completely or incompletely, their resources.

Figure 1:
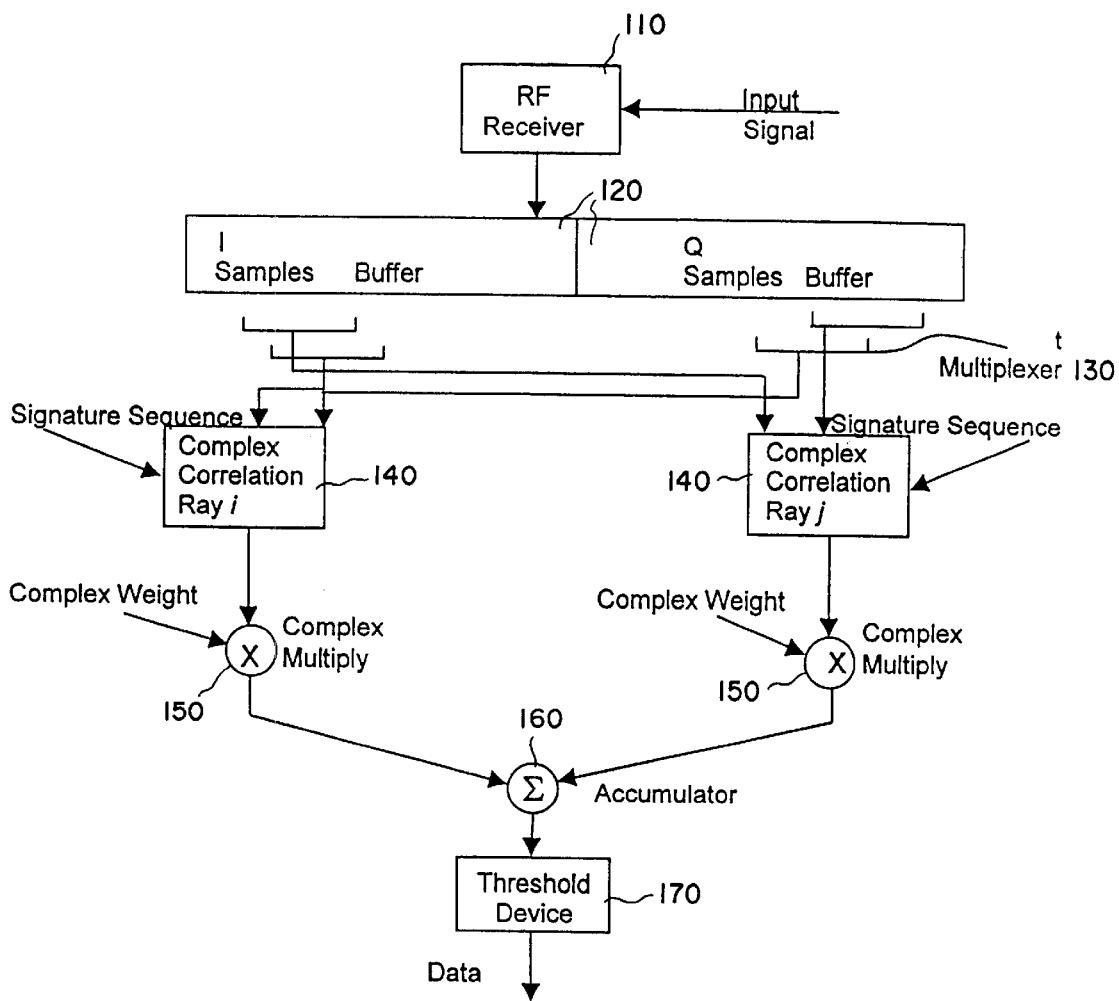
FIG. 1 is a functional schematic of a prior art RAKE receiver.
Figure 2:
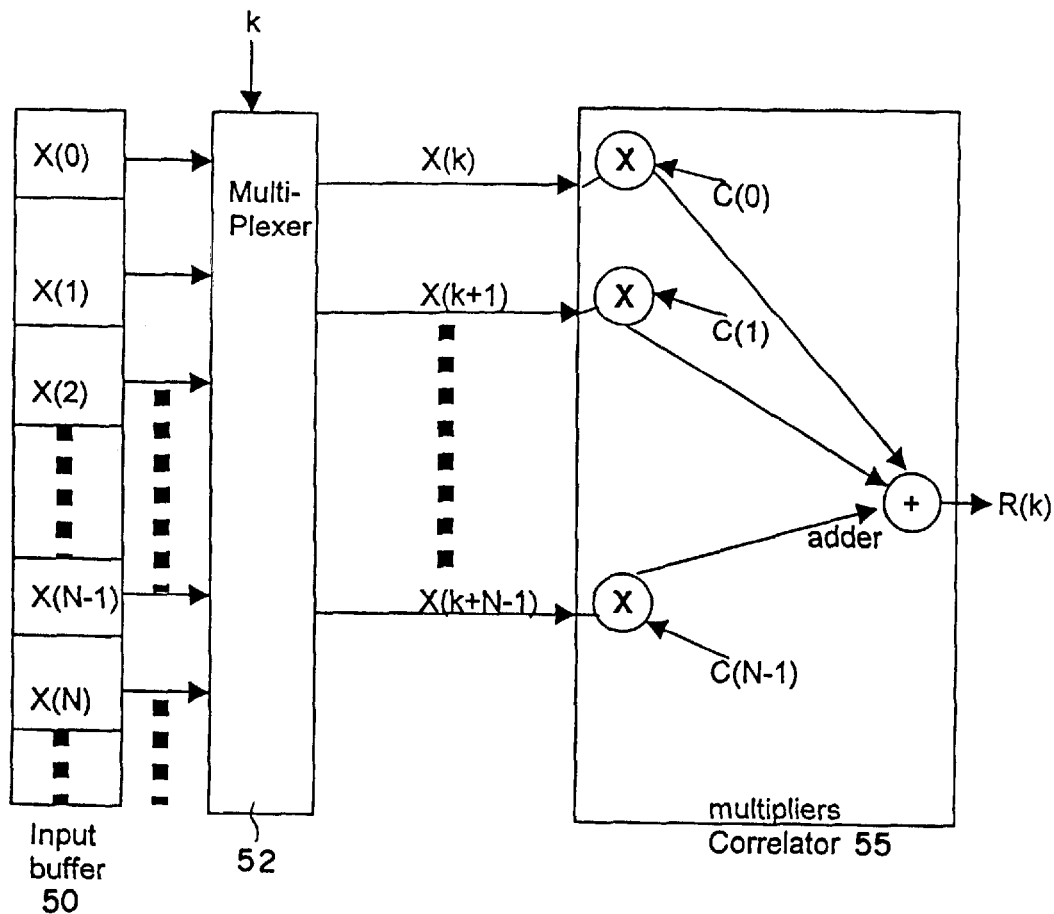
FIG. 2 is a functional schematic of a prior art parallel correlator.
Figure 3:
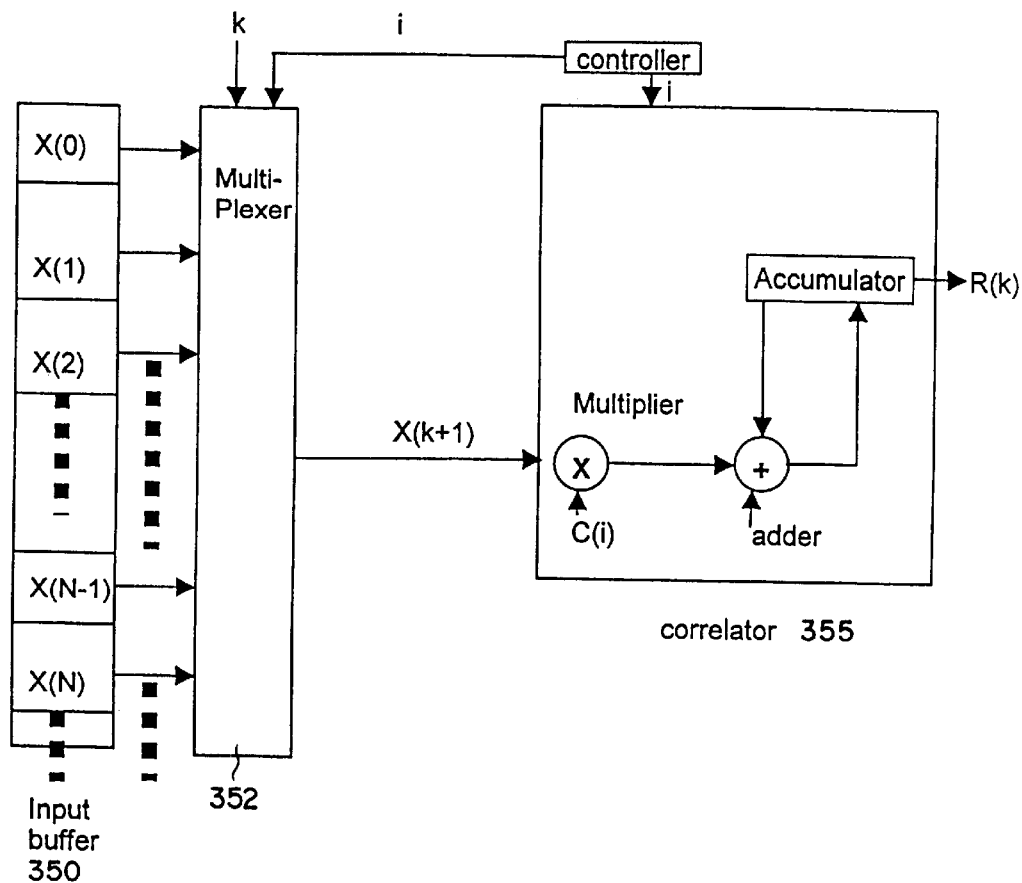
FIG. 3 is a functional schematic of a prior art serial correlator.
Figure 4:
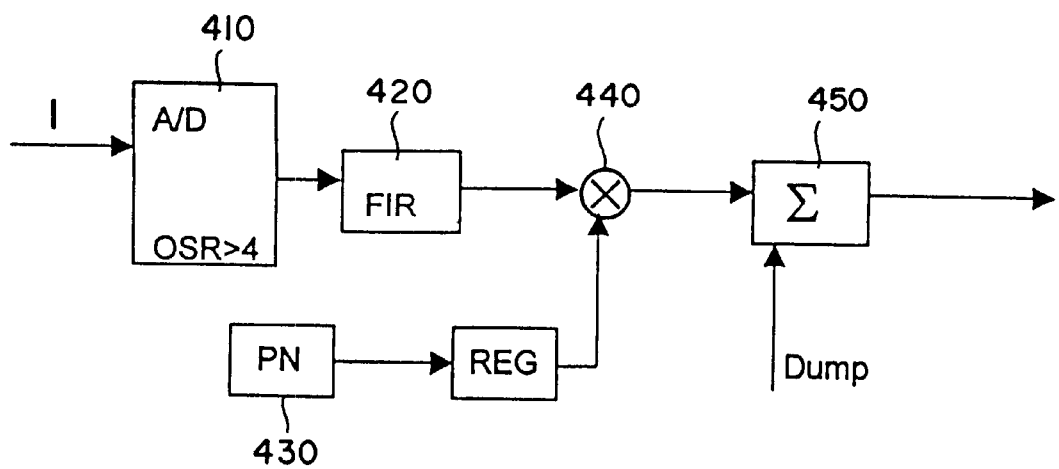
FIG. 4 is a schematic of a section of a state of the art CDMA RAKE receiver, with one RAKE tap shown.

These filters 530, 540, are the typical finite impulse response (FIR) filters as shown in FIG. 4, except here they are being used on single bits from the PN sequence. This results in the replacement of the multibit pulse-matched filter on the input signal, as in FIG. 4, with a one-bit pulse shaped filter on the PN sequence, which interpolates up to the required oversampling ratio ("OSR"), which is N in FIG. 5.

Interpolation is had when the output of the filters 530, 540, is at a higher sample rate than the input. It can be viewed as inserting zero samples in between samples on the input stream to get the sample rate up to the output sample rate and using a filter with the same input and output rate. The efficient way of doing this, with multirate filters, can be viewed in many ways, among others simply as throwing away all the multiplications in the filter that are known before hand to be with zero. Since the result of any multiplication with zero is known to be zero, these results do not have any effect on the output.

The filters 530, 540, are really stored impulse responses, which are used as coefficients for multiplication with a signal 501. Sending one bit through the filter 530, 540, gives the filter's response as output. Sending a sequence of two bits through the filter 530, 540, gives a superposition of the filter's impulse response for two magnitudes (which in the case of one bit can be plus or minus one, +1 or −1) and two corresponding time shifts. This requires that an adder, e.g. 550, 560, that adds together the two responses at the output.

The number of possible outputs from the filters 530, 540, for a two-bit sequence is 4 (−1−1, −1+1, +1−1, +1+1). The combinations (−1−1 and +1+1) are really just the inverse of each other, so they can be had as the same stored response with or without a minus sign. The (−1+1 and +1−1) combinations are both the inverses of each other and reverses of each other which means that their corresponding output sequences can be had from the same stored response either by selectively adding a minus sign to the output or by reading the impulse response for the two-bit combination in the forward direction or in the reverse direction.

By using this technique, only two responses have to be stored. For example, the responses for +1+1 and +1−1, and for a two-bit input, no adders have to be used. Correspondingly, the number of input combinations for a 4-bit sequence is 16, and by using the inverse and reverse symmetries of the four-bit sequences to determine which response is read out, and what operation to do on it afterwards, it can be reduced to storing 6 responses instead of 16. The number of adders are reduced to ¼ since the impulse responses corresponding to the sequences of four bits can be had without adders.

Grouping in 1-chip sequences, a normal FIR filter, requires one stored response and N−1 adders for an N-sample filter response. Grouping in 2-chip sequences requires two, 4 without reductions, stored responses and N/2−1 adders. Grouping in 3-chip sequences requires three, 8 without reductions, stored responses and N/3 adders. Grouping in 4-chip sequences requires six, 16 without reductions, stored responses and N/4−1 adders. There is a tradeoff between the number of stored responses, mainly the area consumed, and the number of adders, mainly power consumed. These adders are not shown here, but are an integral part of the filters 530, 540, or their shared resources. They should be contrasted with the adders 550, 560, which are used to perform part of the correlation. Similarly, the storage means for storing the filter responses is also a part of each filter 530, 540, and is not shown in detail in FIG. 5.

Since the FIR filter has a one-bit input, the multipliers of prior art receivers, as in FIG. 4, reduce to the adders of the present invention in FIG. 5. It is also possible to reduce the number of adders by storing multiple filter responses that correspond to short PN sequences. For example, storing 6 responses corresponding to 4-chip sequences can reduce the number of adders by a factor of 4. There is an advantage of using adders in the present invention instead of multipliers. In current methods using multipliers the number of multipliers and the speed at which they run increases with the oversampling ratio in a conventional receiver as in FIG. 4. However, in systems which would use adders as with the present invention, the number of adders would not increase with the oversampling ratio using a one-bit filter which interpolates up to the oversampling ratio (OSR), as in FIG. 5. The speed of the adders does increase with an increase in the OSR.

In the preferred embodiment of the present invention the input signal 501 is fed to an A/D converter 502, or the signal could be modulated in the digital domain. Although it is a typical A/D converter 502 which is shown in FIG. 5, it is preferred that a sigma-delta A/D converter be used for reasons discussed below.

The sigma-delta signal does not have to be decimation filtered, since a lowpass response is in the correlation sequence. The result of this is that cheap sigma-delta A/D converters can be used that have a passband just enough for the signal, but without having to filter out the noise and decimate. The sigma-delta modulators would in many cases not have to have an oversampling ratio greater than that required anyway for time resolution, i.e. 8–16 times. The signal from the A/D converter is then correlated with the filtered PN sequences before being sent to the output.

As mentioned above, output 1 570 and output 2 580 receive alternate bits, or alternate parts of a bit, from the sequence. As discussed previously, it is also possible to correlate over two half-bit intervals and add the two results together afterwards, or correlate over three one-third bit intervals etc. Thus, output 1 and output 2 might receive alternate bits or alternate parts of a bit depending on whether the correlation was done over a full bit or only fractions of the bit.

The advantage of using a pulse-shaping filter on the despreading sequence, here a PN sequence 510, which is a 1-bit, interpolating filter, is that a very long impulse response can be had at a low hardware cost. One-bit filters are also low power and allow for a trade-off between power and memory size. Another advantage of the present invention is that use of the sigma-delta A/D converter output can be had without the use of decimation filters. The sigma-delta converters can have just enough passband width to harbor the signal.

Also shown in FIG. 5 are two one-sample delays, or registers $z^{-1}$, 555, 565. These, in combination with the adders 550, 560, form an integrator, analogous to the integrator marked $\Sigma$ in FIG. 4. The bit clock, bit_clk 590, sends a dump signal 595 to the registers 555, 565, which sets the contents of the registers 555, 565, to zero. This dump signal 595 is sent at either the positive or negative edge of the bit_clk 590.

Figure 6:
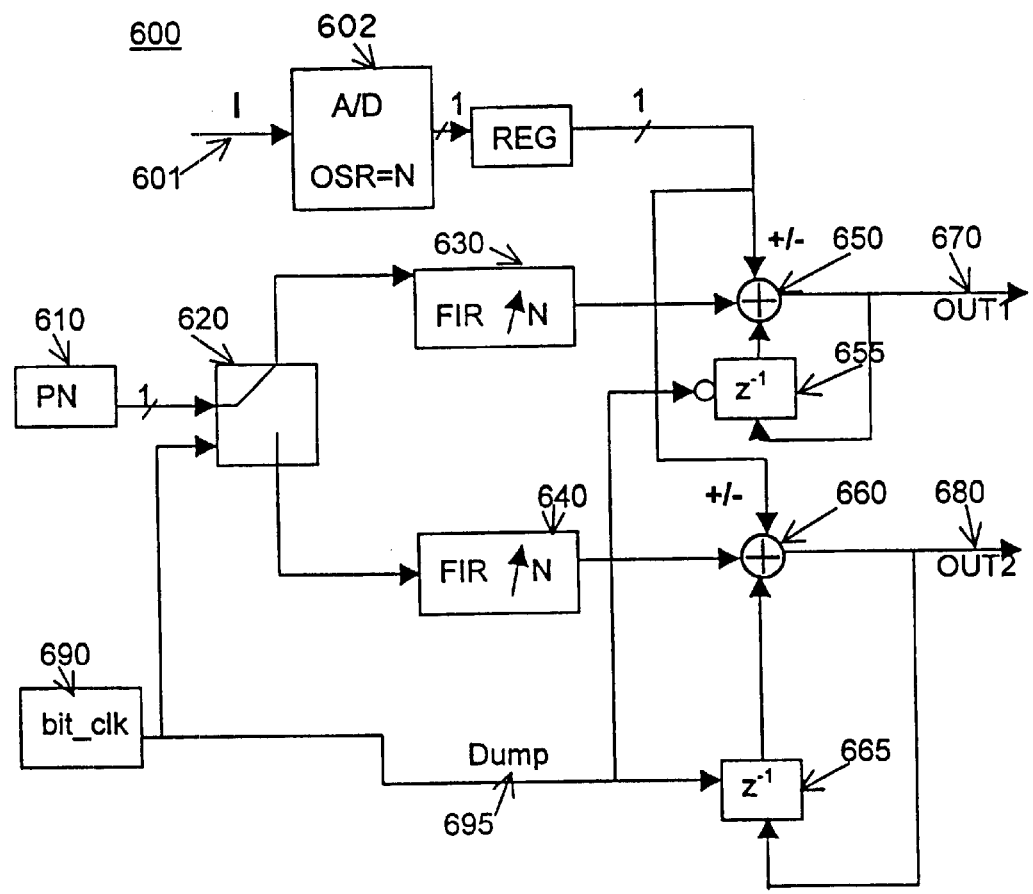
FIG. 6 is an alternate embodiment of the present invention.

In FIG. 6 is shown an alternate embodiment of the present invention. What is different here is the way the registers are triggered. The bit clock, bit_clk 690, sends a dump signal 695 to the registers 655, 665, which sets the contents of the registers 655, 665, to zero. This dump signal 695 is sent at either the positive or negative edge of the bit_clk 690. In FIG. 6 the dump signal 695 is routed differently than in FIG. 5. In FIG. 6 the dump signal 695 is sent to the lower register 665. Before reaching that register 665 it is branched and also sent to the upper register 655.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A correlation receiver comprising:
   an input signal;
   a spread sequence being a pseudonoise ("PN") sequence; and
   a filtering means for filtering said spreading sequence, wherein
   alternating intervals of said pseudonoise sequence are applied to said filtering means to generate filtered intervals, said intervals being less than or equal to one bit in length, thereby interpolating said intervals up to a fixed oversampling ratio OSR=N;
   said filtered intervals are then correlated with said input signal; and
   said correlation is sent to an output means.

2. The correlation receiver of claim 1, wherein the length of said intervals is a fraction 1/N, N an integer, of 1 bit length.

3. The correlation receiver of claim 1, wherein
   said correlation is performed using a correlation adding means and said correlation from each of said correlation adding means is sent to said output means.

4. A correlation receiver comprising:
   an input signal;
   a spread sequence being a pseudonoise ("PN") sequence; and
   a filtering means for filtering said spreading sequence, wherein
   said filtering means being a storing means and a number of adding means in said filtering means is reduced by storing, in said storing means, multiple filter responses corresponding to short PN sequences.

5. The correlation receiver of claim 4 wherein the number of said stored multiple filter responses is reduced by time-reversing and/or inverting.

6. A correlation receiver comprising:
   an input signal;
   a spread sequence being a pseudonoise ("PN") sequence; and
   a filtering means for filtering said spreading sequence, wherein
   a bit clock which sends a dump signal to two registers $Z^{-1}$, one register corresponding to said filtering means, said dump signal being sent at either the positive or negative edge of the bit clock, and said dump signal setting the contents of said two registers to zero.

* * * * *